(No Model.)
W. STANLEY, Jr. & J. F. KELLY
SYSTEM OF ELECTRICAL DISTRIBUTION.
No. 507,391. Patented Oct. 24, 1893.
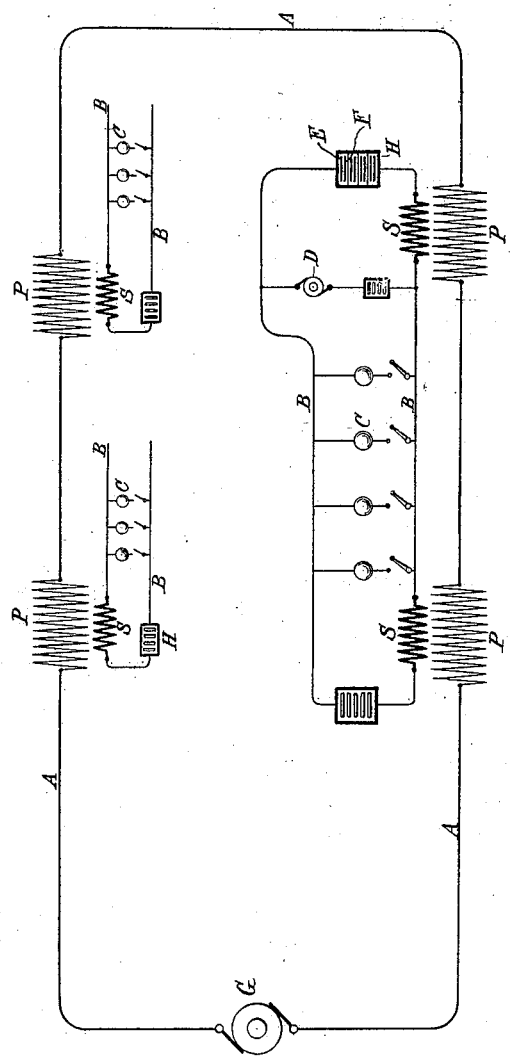
Witnesses:
Raphaël Netter
Ernest Hopkinson
Inventors
William Stanley, Jr.
and John F. Kelly
by Duncan & Page
Attorneys

UNITED STATES PATENT OFFICE.

WILLIAM STANLEY, JR., AND JOHN F. KELLY, OF PITTSFIELD, MASSACHUSETTS.

SYSTEM OF ELECTRICAL DISTRIBUTION.

SPECIFICATION forming part of Letters Patent No. 507,391, dated October 24, 1893.

Application filed March 8, 1892. Serial No. 424,350. (No model.)

*To all whom it may concern:*

Be it known that we, WILLIAM STANLEY, Jr., and JOHN F. KELLY, citizens of the United States, residing at Pittsfield, in the county of Berkshire and State of Massachusetts, have invented certain new and useful Improvements in Systems of Electrical Distribution, of which the following is a specification, reference being had to the drawing accompanying and forming a part of the same.

The object of our present invention is to provide a self-regulating converter or transformer system of electrical distribution in which the primaries of the induction devices are connected in series with the main or inducing circuit and the translating devices in multiple with the secondaries by which they are supplied with current. Such a system involves a primary generator capable of or adapted to yield a constant current of high tension, which by means of a converter or series of converters is delivered under a much lower but constant or uniform pressure or electro-motive force into the local or secondary circuits containing the translating devices.

Alternating current generators of themselves capable of or provided with special appliances for delivering a constant current are now well-known, and in carrying out our invention we make use of any generator of alternating or similar current that possesses this characteristic. We also employ such transformers as are commonly used in the present systems of multip'e-arc conversion and distribution, but with these devices when arranged as above stated, with their primaries in series with the generator, we combine polarization cells connected up in the secondary circuits, in series with the translating devices therein, by which, when the conditions hereinafter set forth are observed, the desired results of self-regulation of the system are secured.

In the accompanying drawing, in which the figure is a diagram of our system, G, represents a constant current alternating generator, A, A the circuit therefrom, and P, S, P, S, the primary and secondary coils respectively of a number of transformers, the primary coils P being included in series in the main circuit. The secondary coils constitute the sources of currents for the working of local circuits B, B, in which incandescent lamps C or motors D are included or adapted to be connected in multiple-arc.

The drawing shows two ordinary and well-known plans of connecting the translating devices with the secondary coils; one in which a group of translating devices is supplied by a single secondary, and the other, that shown in the lower portion of the figure, in which two secondaries are connected with the working circuit in multiple.

The phase of the secondary current in any transformer is determined by the action of two electro-motive forces; one, the electro-motive force induced by the primary current, and the other, that of the self-induction of the secondary coil. The first electro-motive force is ninety degrees later than the primary current phase, while the secondary electro-motive force is at right angles to or ninety degrees later than the secondary current, and these two forces co-operate to lag the secondary current approximately ninety degrees farther than if no electro-motive force of self-induction were present, or to one hundred and eighty degrees behind the primary current. While this lag exists, the objects of the invention cannot be realized, and we correct it by interposing in each secondary circuit a polarization cell that is capable of yielding an electro-motive force equal to that of the self-induction. These polarization cells consist of a series of conducting plates E, F, arranged in couples in jars or compartments in a trough or box H, and connected in series through an electrolyte by which they are not chemically attacked, such as carbon plates in acidulated water, or iron plates in a solution of caustic potash. When a current less than that which would be necessary to produce actual electrolysis is passed through such a cell, an electro-motive force of polarization is set up which for a given current is in proportion to the number of plates or couples in series and which also varies in proportion to the current. This electro-motive force is available for neutralizing that of self-induction in any circuit and is a highly efficient and economical device for the purpose. In practice the cell should have the lowest possible resistance, which is effected by bringing the plates very close together, and it should be so constructed that no electro-motive force which it is ever called on to yield should be sufficient to cause the breaking down of the electrolyte. By the employment of such a device in the secondary circuits and the neutralization thereby of the electro-motive force of self-induction, the secondary current is brought back to ninety degrees from the primary current.

The counter electro-motive force in the primary circuit depends upon the total magnetization of the secondary cores, and this magnetization is increased by every increment of secondary current, when the electro-motive force of self-induction in the secondary is neutralized, for the reason that the primary and secondary currents are then ninety degrees apart. Hence the work done by the generator upon the transformers is greater because of the increase of the counter electro-motive force in the primary circuit. As lamps or other devices therefore are brought into the local circuits, increasing the loads on the secondaries, the generator does more work in maintaining the current constant in the primary circuit.

With an increase of load on the secondaries the electro-motive force at their terminals also increases by reason of the rise in the electro-motive force of self-induction, but this latter is neutralized by the increase in the electro-motive force of the polarization cell due to the increased current, so that the available electro-motive force in the local or working circuit remains constant. Given, therefore, a source of constant alternating current, a constant electro-motive force in one or more local or working circuits may be automatically maintained by transformers, the primaries of which are in series in the main circuit, by including in the circuits of the secondaries which supply the current to the working circuits, polarization cells so adjusted or adapted as to neutralize the electro-motive force of the self-induction of the secondary circuits. Inasmuch as these cells have immense capacity in very small compass, and are very cheaply and easily made, their value for this purpose is very great.

What we claim is—

1. In a system of electrical distribution, the combination of a generator or source of alternating currents of constant strength, primary coils connected in series with the said source, secondary coils forming the sources of current for local working circuits and polarization cells in series with the secondaries and adjusted or adapted to neutralize the electro-motive force of self-induction in the secondary circuits, as set forth.

2. In a system of electrical distribution, the combination of a constant current alternating generator, a circuit and primary coils in series therein, local or working circuits containing translating devices in multiple-arc, secondary coils for supplying current thereto, and polarization cells in series with the secondary coils adapted to neutralize the electro-motive force of self-induction therein, as described.

WILLIAM STANLEY, Jr.
JOHN F. KELLY.

Witnesses:
WILSON D. CARPENTER,
HENRY J. RYAN.